United States Patent [19]

Bunas

[11] 4,088,540
[45] May 9, 1978

[54] SOLVENT DEASPHALTING APPARATUS

[75] Inventor: Bennie I. Bunas, Chicago, Ill.

[73] Assignee: UOP Inc., Des Plaines, Ill.

[21] Appl. No.: 739,219

[22] Filed: Nov. 5, 1976

[51] Int. Cl.² .................. B01D 11/04; C10G 21/14; C10G 43/12

[52] U.S. Cl. .................. 196/14.52; 23/270.5 T; 208/309

[58] Field of Search .............. 196/14.52; 23/270.5 T; 208/309

[56] References Cited

U.S. PATENT DOCUMENTS

| | | | |
|---|---|---|---|
| 2,088,497 | 7/1937 | Tijmstra | 196/14.52 X |
| 2,139,589 | 12/1938 | Ittner | 23/270.5 T UX |
| 2,153,507 | 4/1939 | Mann | 23/270.5 T X |
| 2,205,986 | 6/1940 | Mangelsdorf et al. | 196/14.52 |
| 2,383,535 | 8/1945 | Dickinson et al. | 208/309 |
| 2,664,384 | 12/1953 | Benedict | 208/309 |
| 2,669,539 | 2/1954 | Ditman | 208/309 |
| 2,834,715 | 5/1958 | Pratt | 208/309 |
| 2,950,244 | 8/1960 | Lawson | 208/309 |
| 3,173,763 | 3/1965 | Miller et al. | 196/14.52 X |
| 3,202,605 | 8/1965 | Redcay | 208/309 X |
| 3,423,308 | 1/1969 | Murphy | 208/309 |
| 3,477,915 | 11/1969 | Gantt et al. | 202/155 |
| 3,627,675 | 12/1971 | Ditman et al. | 196/14.52 X |
| 3,632,315 | 1/1972 | Uitti et al. | 23/270.5 T |
| 3,658,695 | 4/1972 | Van Pool | 208/309 X |
| 3,811,843 | 5/1974 | Morfit et al. | 196/14.52 X |
| 3,811,844 | 5/1974 | Dunmyer et al. | 23/270.5 T |
| 3,830,732 | 8/1974 | Gatsis | 208/309 |
| 3,972,807 | 8/1976 | Uitti et al. | 208/309 |
| 3,981,797 | 9/1976 | Kellar et al. | 208/309 |

Primary Examiner—Barry S. Richman
Attorney, Agent, or Firm—James R. Hoatson, Jr.; Robert W. Erickson; William H. Page, II

[57] ABSTRACT

An apparatus and process for the solvent deasphalting of petroleum stocks. An asphaltene containing feedstock enters an intermediate point of a vertical trayed column and passes downward countercurrent to a rising solvent stream. The resulting extract stream rises through more trays and then through two adjacent U-tube heat exchanger bundles stabbed into the column from opposite sides. Asphaltene containing substances are precipitated by this heating. The extract is then admixed by a horizontal shroud and a pair of horizontal baffles above the heat exchangers and retained in a quiescent settling zone before being removed from the column.

3 Claims, 2 Drawing Figures

SOLVENT DEASPHALTING APPARATUS

FIELD OF THE INVENTION

The invention relates to the processing of mineral oils. The invention more specifically relates to an apparatus for treating or purifying an asphaltene containing mineral oil by liquid-liquid or solvent extraction. The invention also relates to a process for deasphalting heavy, asphaltene-containing mineral oils by countercurrent contacting with a light hydrocarbon liquid such as propane.

PRIOR ART

Solvent deasphalting of heavy petroleum fractions is an established and widely practiced process which finds utility in the petroleum industry. Those skilled in the art are generally aware of the fundamentals of the process, and they may be reviewed by reference to such standard information sources as *Petroleum Refinery Engineering*, Nelson, 4th Ed., McGraw-Hill Book Co., New York, 1958. Solvent deasphalting methods are also examined in the article appearing at pages 56-64 of the Sept. 30, 1974 edition of *The Oil and Gas Journal*.

Processes for deasphalting heavy oils are described in U.S. Pat. Nos. 2,383,535; 2,664,384; 2,834,715; 2,950,244 and 3,423,308 (Cl. 208-309). These references demonstrate that the prior art is cognizant of the use of solvents such as propane and butane and has recognized the benefits obtained by the addition of heat to the extraction column at a point above the entry level of the heavy oil. This heating of the upper section of the column is referred to as "top-heating" and has the effect of causing the precipitation of additional amounts of asphaltic material which is then withdrawn from the bottom of the column. Variations on this basic process are presented in U.S. Pat. Nos. 3,627,675 and 3,830,732.

The traditional method of top heating the extraction column is to use internally disposed indirect heat exchangers. This is shown in the previously cited references. The heat exchangers illustrated in these references either pass through both sides of the column in the manner of U.S. Pat. No. 2,834,715 or are a single bundle of U-tubes such as shown in U.S. Pat. No. 2,664,384.

The apparatus often used in solvent deasphalting is similar to that used in fractional distillation. U.S. Pat. No. 3,477,915 (Cl. 202-155) illustrates the use of two bundles of U-tubes as heating elements at intermediate elevations within a fractionation column. These two bundles are parallel and at the same elevation, but the reference does not teach their insertion through opposite sides of the column wall to facilitate service and installation. The references also do not describe the sigmoid liquid passage above the heating elements formed by horizontal baffles and shrouds as claimed herein. Furthermore the references do not present the use of a settling or separation zone located above the heat exchangers.

In my previous application, now U.S. Pat. No. 3,972,807, there is described a different method of top heating a solvent deasphalting column. This method involves removing a stream of the extract material at an elevation above the feed tray and externally heating this stream and then returning it to the column at yet a higher elevation. An objective of this is to avoid the maintenance and availability problems of internal heat exchangers and to reduce capital costs.

BRIEF SUMMARY OF THE INVENTION

The invention provides a new and useful process and apparatus for the solvent deasphalting of heavy black oil charge stocks in which top heating of the solvent rich extract is accomplished by passage through at least one layer of heat exchange elements which are formed by two bundles of U-shaped heat exchange tubes. The bundles are inserted into the column through opposite sides of the column and lie in the same horizontal plane. The thus heated extract stream is then brought to a uniform temperature by upward passage through a sigmoid mixing zone formed by a centrally disposed horizontal shroud located directly above the heat exchange tubes and two horizontal baffles attached to the wall of the column above the shroud and adjacent to the shroud's straight exterior edges. The extract stream is then retained within a quiescent settling zone located above the baffles to ensure complete separation of the precipitated asphaltic material.

For simplicity and clarity of presentation numerous items, such as valves, manways, and control supports andcontrol systems, which are necessary for operation of the apparatus but which do not form a part of the inventive concept have been deleted. This description of the preferred embodiment is not intended to preclude modification of the invention in a manner obvious to those skilled in the art or as otherwise described herein.

Figure 1:
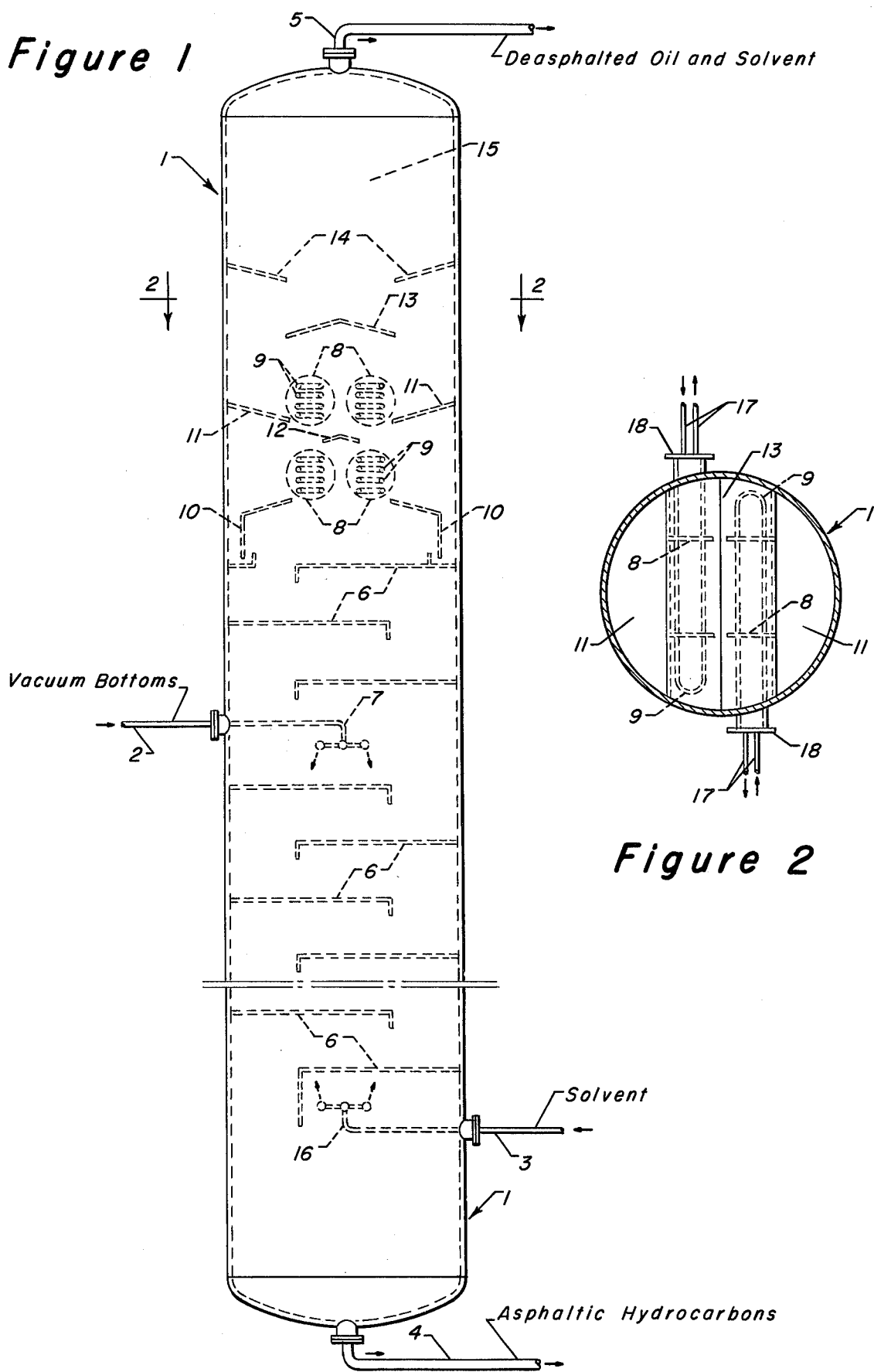
FIG. 1 is a vertical cross-section of a solvent deasphalting column constructed according to the preferred embodiment of the invention.

Referring now to FIG. 1, a feed stream of a liquid phase vacuum bottoms charge stock is passed into an intermediate point of the column 1 through line 2. This feed stream is distributed across the cross-section of the column by a branched array of perforated horizontal conduits 7. The feed stream is denser than the other liquid in the column and therefore descends, passing over a plurality of horizontal liquid-liquid contacting trays 6. A solvent stream comprising butanes and pentanes is fed into the column through line 3 and distributed through a second array of perforated conduits 16. This solvent rises through perforations in the contacting trays countercurrent to the feed stream. The more desirable components of the feed stream, such as lube oil base stock, enter the solvent phase to form an extract stream. Heavier asphaltic materials do not enter the solvent phase and eventually settle to the bottom of the column and are removed in line 4.

The extract stream which is formed in this manner rises above the feed point and passes through a second plurality of contacting trays 6. This is done to remove from a descending stream of asphaltic material formed above whatever materials are soluble in the solvent at the conditions imposed. The extract is then channeled upward toward the center of the column by two symmetrically positioned flow guides 10. The extract stream is thereby caused to pass upward through either of two bundles of U-shaped heat exchange tubes 9 held apart by a circular spacer 8. A horizontal shroud 12 prevents upward passage of the extract between the two bundles. A pair of horizontal baffle plates 11 then directs the extract stream through a second pair or layer of U-shaped heat exchangers. The resulting increase in the temperature of the extract stream causes the precipitation of the asphaltic material which descends through the second group of contacting trays. These baffles and the other baffles and shrouds are preferably slanted downward in a direction opposite the flow of the extract to guide descending asphaltic liquid. Each of the upper pair of heat exchange bundles passes through the side wall on an opposing side of the vessel from bundle directly below it.

The extract stream is then brought to a uniform temperature by passage through a sigmoid mixing zone. The curved path of the mixing zone is created by a second shroud 13 positioned above the tube bundles and aligned with the bundles and by another pair of baffle plates 14. This mixing zone is intended to prevent cold extract liquid from streaking past the sides of the heat exchangers and remaining unheated. Above the baffles a settling zone 15 is provided to allow small droplets of asphaltic material to coalesce and settle out of the extract stream, which is then removed in line 5 for separation of the solvent and the extracted hydrocarbons.

Figure 2:
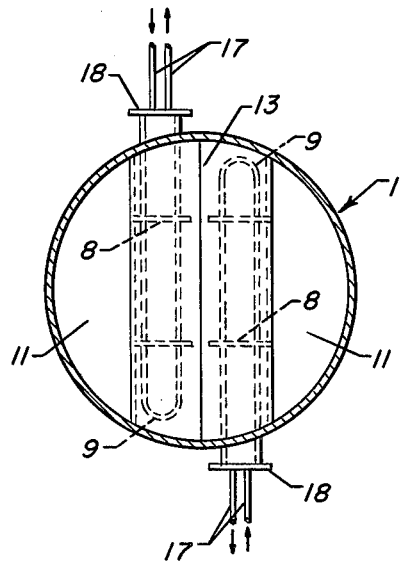
FIG. 2 is a horizontal cross-section of the column taken just above shroud 13 and looking downward.

FIG. 2 is presented to more clearly describe the arrangement of the two bundles of heat exchange tubes 9 within the outer vessel of the column 1. The heating fluid is carried to and from the heat exchangers by conduits 17 attached to the outer end or head 18 of each tube bundle. The fluid passes through a stationary tube sheet into the individual U-shaped tubes 9. Only a single tube is illustrated, but a large number of tubes at differing elevations are provided. These tubes are held in position by the spacer plates 8. The two bundles enter the column from diametrically opposed positions, are parallel and at the same elevation. In this view the preferred chordal shape of the horizontal baffle plates 11 is apparent. These baffles terminate with straight edges which are parallel with each other and the heat exchange tubes. The edges of the baffle plates are under the shroud 13, which also terminates in straight edges parallel to the heat exchange tubes. The shroud is preferably symmetrically positioned above the two heat exchange bundles as shown.

DETAILED DESCRIPTION

Solvent deasphalting or decarbonization is used for the removal of asphaltic and resinous materials from heavy petroleum stocks. These feed materials may be broadly characterized as having boiling points, as determined by the appropriate ASTM distillation procedure, above about 600° F. at one atmosphere of absolute pressure. They will normally contain appreciable amounts of sulfur and various metals, such as nickel or vanadium. The asphaltic material is generally associated with these impurities by chemical combination. The asphaltenic materials are high molecular weight, non-distillable coke precursors which are insoluble in light hydrocarbons such as pentane or heptane. The charge stock to a solvent deasphalting operation is often broadly classified in the art as a black oil, a term which is intended to refer to and include atmospheric tower bottoms, vacuum tower bottoms (vacuum residuum), topped crude oils, coal oil extract, shale oils and heavy oils recovered from tar sands. Specific examples of those charge stocks to which the process is applicable include a vacuum column bottoms having a gravity of 7.1 °API and containing 4.05 wt.% sulfur and 23.7 wt.% asphaltenes; a 11.0 °API topped crude oil which contains 10.0 wt.% asphaltenes and 5.2 wt.% sulfur; and a vacuum residuum containing about 3.0 wt.% sulfur, having a gravity of about 8.8 °API and a 20 volume percent distillation point temperature of approximately 1055° F.

Basic to the deasphalting process is the multistage countercurrent contacting of the black oil feed stream with a rising solvent stream. The solvent may be any suitable hydrocarbonaceous material which is a liquid within suitable temperature and pressure ranges for operation of the column, is less dense than the feed stream, and has the ability to readily and selectively dissolve desired components of the feed stream and reject the asphaltic materials. The solvent may be a mixture of a large number of different hydrocarbons having between 5 to 14 carbon atoms per molecule, such as a light naphtha having an end boiling point below about 200° F. The solvent may be a relatively light hydrocarbon such as ethane, propane, butane, isobutane, isopentane, hexane and heptane or the corresponding mono-olefinic hydrocarbons. Preferably, the solvent is comprised of paraffinic hydrocarbons having from 3 to 7 carbon atoms per molecule and is a mixture of two or more hydrocarbons. For instance, a preferred solvent comprises a 50 vol.% mixture of normal butane and isopentane.

Solvent extraction promoting conditions include a temperature of from about 50° to 600° F. or higher, but the extraction operation is preferably performed within the temperature range of 100°–400° F. These solvent extraction temperatures refer to the conditions present in the lower section of the apparatus and up to the level of the heat exchangers. A higher temperature is maintained above the heat exchangers. Preferably, this temperature is from 20° to 100° F. above that maintained in the lower section of the apparatus. The pressure utilized within the extraction column will be the same at all points except for pressure differentials caused by liquid flow and the hydrostatic head of the retained liquids. The pressure must be sufficient to maintain liquid phase conditions, with no advantage being apparent to the use of elevated pressures which greatly exceed this minimum. A broad range of suitable pressures is from about 100 psig. to 1000 psig., with a preferred range being from 200 to 600 psig. An excess of solvent to charge stock must be maintained. The solvent/charge stock volumetric ratio should be between 2.0:1.0 to about 20.0:1.0 and preferably from about 3.0:1.0 to about 9.0:1.0. The extraction column should be sized to provide a residence time of from about 20 to 40 minutes.

It is preferred that the process is performed in a vertical cylindrical column containing a number of stationary horizontal contacting trays. A rotating disk contactor may also be used as shown in U.S. Pat. No. 3,627,675.

For purposes of description, the configuration of various elements of the apparatus will be described in the form preferred for use with the specific process streams set out below by way of example. In this preferred apparatus the liquid-liquid contacting trays are vertically spaced about 18 to 40 inches apart and contain a large number of circular perforations in the middle third (by width) of the tray. A larger vertical spacing is used at the charge stock feed point. The perforations may be between ½ and 1 inch in diameter. The preferred tray has no weir to retain liquid on its upper surface, but has a lip which extends downward as illustrated in the drawing about 4–12 inches. A void space for vertical liquid transfer is provided by the deletion of about one-third of the tray on alternating sides of the trays. About 10 to 18 trays are provided between the charge stock feed point and the lower solvent feed point. An additional two to four trays are provided above the charge stock feed point.

Both the charge stock and the solvent stream are preferably charged to the extraction column through horizontal branched distribution arrays. Suitable arrays for use with the hereinafter exemplary flow rates comprise three parallel 4-inch schedule 80 pipes having a total of between 200 to 400 ⅜-inch perforations. The perforations face downward for the feedstock and upward for the solvent. Other distribution means including nozzles and perforated sheets may be employed. Alternatively, these streams may simply be charged into the column without the use of a distributor. A liquid outlet is provided at both the bottom and the top of the vessel. No straining device or collector is necessary and the outlets may be simple openings flush with the vessel's interior surface. A vortex breaker may be installed in the bottom of the vessel above the asphalt outlet.

The outer vessel is of conventional design and comprises a cylindrical outer wall sealed at its upper and lower ends with concave caps. Customary design standards will dictate its wall thickness, etc. Carbon steel is a suitable construction material for the vessel, baffles, trays and distributors under the preferred process conditions. A vessel suitable for the flow rates set out below is about 80 feet high tangent to tangent and has an inside diameter of about 13½ feet. This outer vessel and the entire apparatus is divided into upper and lower sections by the charge stock feed point. Preferably this feed point is within the middle vertical one-third of the apparatus.

The upward flow of the solvent-rich extract stream in the upper section of the column is at laminar flow conditions. The shell side heat transfer coefficient is therefore rather low and large surface areas are required for the heat exchangers used for top heating. A considerable amount of tubing is therefore required to be placed within the apparatus. This often requires a large number of joints and connections which tend to develop leaks. Prior art heat exchangers either have inlets at one side of the column and outlets on the other as shown in U.S. Pat. No. 3,423,308 or consist of U-tubes inserted from just one side of the column. These configurations are often difficult to service, as for the removal of tube bundles or the replacement of individual tubes, because of the close proximity of a large number of tube endings or of the ends of one or more bundles. It is therefore one objective of the invention to provide an apparatus for solvent deasphalting of black oils in which the heat exchangers are easy to service and which have a high degree of reliability and availability. It is another objective to provide an apparatus which provides uniform top heating of the extract and which promotes the complete precipitation and settling of asphaltic material from the extract stream.

In the subject apparatus the heat exchangers comprise an even number of bundles of U-tubes which are inserted horizontally into the extraction column from opposite sides of the column. Any two bundles at the same elevation do not share the same longitudinal axis. That is, they do not face one another. Rather, the longitudinal axis of each bundle is horizontally offset from the other. They are, however, parallel and at the same elevation as shown in the drawing. Preferably four such bundles are used in two layers, with the side from which the bundle is inserted also alternating from top to bottom. That is, the upper of two vertically adjacent bundles is inserted through the opposite side of the column from that directly below.

A series of horizontal baffle plates and shrouds are provided to direct the extract phase through the heat exchange tubes in a substantially upward direction. Preferably, the shrouds and baffles have a configuration similar to that shown in the drawing. The baffles and shrouds have a 15° inclination from horizontal. The baffles are preferably imperforate and chordal in shape and terminate with a horizontal straight edge parallel to the longitudinal axis of the heat exchange tubes. The tube bundles are preferably supported by two or more horizontal beams which are perpendicular to the tube bundles. The straight edges of the baffles which are at the same level as the tube bundles are preferably attached to these beams or to supports extending upward from the beams to the bundles. In the preferred embodiment the straight edges of the baffles terminate close to or at the vertical planes passing through the outermost heat exchange tubes. The same is true of the shroud above the upper layer of heat exchangers. Each circular edge of the baffles is preferably welded to the interior surface of the vessel. Other baffle configurations may be used with the subject process. Possible variations include baffles having different inclinations, shapes or cross-sectional areas and the provision of a limited number of perforations in the baffles.

A lower shroud is operatively positioned between the two layers of heat exchangers to prevent channeling of the extract upward between both pairs of heat exchange bundles. It preferably has the inverted V-shape illustrated, but may be curved or flat. This shroud is relatively narrow compared to the upper shroud. In the preferred embodiment the width of the upper shroud is slightly greater than twice the radius of a tube bundle. The upper shroud may be located about six feet above the bottom of the upper layer of tube bundles, with the next pair of baffles located about 2½ feet above the shroud. It is preferred that these upper baffles have substantially the same size, location and shape as the baffles adjacent the upper pair of tube bundles. This forms a sigmoid liquid path which mixes the extract stream to a uniform temperature.

Although asphaltic material will be precipitated in the initial passage of the extract stream through the heat exchangers, a portion of the extract may not be heated to an adequate temperature without an additional degree of admixture. This factor must be taken into effect in the design of solvent deasphalting apparatus and processes. Another consideration is that small globules of the asphaltic material may be formed in the initial heating step, and that these small particles may remain suspended in the rising extract. Furthermore, mixing operations to remove temperature gradients are often not conducive to effective separation, agglomeration and settling of small particles. It is an objective of the subject invention to provide a solvent deasphalting process which effects a mixing of the top heated extract to a uniform temperature and which effects complete and effective settling and separation of the resultant precipitated asphaltic material.

This objective is accomplished in part through the use of a mixing zone, such as that just described, above the heating means used to accomplish the top heating. In addition the extract stream is then passed into a quiescent settling or separation zone. Preferably, this zone has no cross members, baffles or structural elements which would tend to agitate the extract. A coalescing means such as a mesh blanket may be provided. This zone in its simplest and preferred form is a void cylindrical volume in the upper section of the apparatus as illustrated. It should have a height greater than the radius of the cylindrical outer wall of the extraction column. An upper limit on its height is about three times this radius. In the apparatus for the exemplary flow streams the distance from the top of the uppermost baffle plate to the top of the side wall of the vessel is about 12½ feet.

The subject apparatus may be characterized as apparatus useful for solvent deasphalting black oils which comprises a vertically oriented vessel having an internal volume formed by a cylindrical side wall which has an internal surface, the vessel being divided into an upper section and a lower section and having upper and lower ends; a solvent inlet means communicating with the internal volume of the vessel at a first point in the lower section of the vessel and above the lower end of the vessel; a charge stock inlet means communicating with the internal volume of the vessel at a higher second point in the vessel; a first plurality of vertically spaced apart and substantially horizontal liquid-liquid contacting trays located within the vessel above the solvent inlet means and below the charge stock inlet means; an indirect heat exchange means located in the upper section of the vessel above the charge stock inlet means and comprising a first and a second bundle of horizontal U-shaped heat exchange tubes which extend across the internal volume of the vessel, each bundle passing through the side wall at only one point, with this point being on the opposite side of the vessel from the point at which the other bundle passes through the side wall and at the same vertical elevation, the two bundles being positioned adjacent each other; a second plurality of vertically spaced apart and substantially horizontal liquid-liquid contacting trays located within the vessel above the charge stock inlet means and below the indirect heat exchange means; a first liquid outlet means communicating with the internal volume of the vessel at the upper end of the vessel, and a second liquid outlet means communicating with the internal volume of the vessel at the lower end of the vessel; a substantially imperforate horizontal shroud operably positioned above the indirect heat exchange means, the longitudinal axis of the shroud being in alignment with the longitudinal axis of the first and the second bundles heat exchange tubes, the shroud having two opposing curved edges which abut the internal surface of the side wall at points directly above the intersection of the heat exchange means with the side wall, the shroud also having two parallel and opposing substantially straight edges which extend between the curved edges, with the straight edges being separated by a distance greater than the combined width of the two heat exchange bundles, and thereby providing for vertical liquid flow two opposing chordal openings in the cross-section of the vessel defined by the straight edges of the shroud and the internal surface of the side wall; a first pair of chordal liquid baffle plates located within the vessel above the shroud, the first pair of plates being operably positioned on opposing sides of the side wall at points directly above the two chordal openings in the cross-section of the vessel defined by the shroud, with each baffle plate having a curved edge which abuts the internal surface of the side wall and a straight edge which is parallel to the straight edges of the shroud, the vertical distance between the first pair of baffle plates and the upper end of the vessel being greater than the radius of the vessel, with the internal volume of the vessel above the first pair of baffle plates being devoid of structural components which extend across the cross-section of the vessel; and a second pair of chordal liquid baffle plates located within the vessel, the second pair of plates being operably positioned on opposing sides of the side wall at points directly below the two chordal openings in the cross-section of the vessel defined by the shroud, each baffle plate having a curved edge which abuts the internal surface of the side wall and a straight edge which is parallel to the straight edges of the shroud, the straight edge of each baffle plate being located below a horizontal centerline through the first and second bundle heat exchange tubes.

The invention is further illustrated by this example of the subject process. The charge stream to the process is a 13,400 barrel per day (BPD) stream of 8.8 °API vacuum column bottoms. This stream is admixed with a 2680 BPD stream of solvent and passed into the extraction column at a pressure of about 370 psig. and a temperature of about 230° F. This admixture of a small portion of the total solvent flow with the charge stream is a customary method of decreasing the viscosity of the charge stream in order to more easily pump and heat it. The charge stream is countercurrently contacted with a rising solvent stream comprising 50 vol.% normal butane and 50 vol.% isopentane at a total solvent to feed volume ratio of about 5. The resulting extraction of the feed stream produces an asphalt bottoms stream removed at a rate of about 3,640 BPD at a temperature of about 225° F. This material has a gravity of approximately 7.5 °API, a pressure of 370 psig. and an average molecular weight of 176. The resultant extract stream is passed upward above the feed point through three contacting trays and then through two layers of heat exchangers. Each layer comprises two U-tube bundles arranged as illustrated in the drawing. The addition of approximately 25.7 million BTU/hr. heats the solvent rich extract from about 222° to 270° F. This causes the precipitation of asphaltic material which eventually descends to the bottom of the column to form part of the asphalt stream. The extract stream is then passed through the sigmoid mixing zone of the preferred apparatus and into a superior settling zone. This produces a deasphalted oil or extract product having a gravity of about 82.6 °API and a temperature of about 270° F. This stream has a flow rate of about 76,760 BPD and a pressure of about 350 psig. The asphalt bottoms stream is heated, flashed and stripped for the recovery of the solvent. Other separatory steps recover the solvent from the extract stream. The solvent is then collected and recycled to the extraction column.

I claim as my invention:

1. An apparatus useful for solvent deasphalting black oils which comprises:
   (a) a vertically oriented vessel having an internal volume formed by a cylindrical side wall which has an internal surface, the vessel being divided into an upper section and a lower section and having upper and lower ends;
   (b) a solvent inlet means communicating with the internal volume of the vessel at a first point in the lower section of the vessel and above the lower end of the vessel;

(c) a charge stock inlet means communicating with the internal volume of the vessel at a higher second point in the vessel;

(d) a first plurality of vertically spaced apart and substantially horizontal liquid-liquid contacting trays located within the vessel above the solvent inlet means and below the charge stock inlet means;

(e) an indirect heat exchange means located in the upper section of the vessel above the charge stock inlet means and comprising a first and a second bundle of horizontal U-shaped heat exchange tubes which extend across the internal volume of the vessel, each bundle passing through the side wall at only one point, with this point being on the opposite side of the vessel from the point at which the other bundle passes through the side wall and at the same vertical elevation, the two bundles being positioned adjacent each other;

(f) a second plurality of vertically spaced apart and substantially horizontal liquid-liquid contacting trays located within the vessel above the charge stock inlet means and below the indirect heat exchange means;

(g) a first liquid outlet means communicating with the internal volume of the vessel at the upper end of the vessel, and a second liquid outlet means communicating with the internal volume of the vessel at the lower end of the vessel;

(h) a substantially imperforate horizontal shroud operably positioned above the indirect heat exchange means, the longitudinal axis of the shroud being in alignment with the longitudinal axis of the first and the second bundles of heat exchange tubes, the shroud having two opposing curved edges which abut the internal surface of the side wall at points directly above the intersection of the heat exchange means with the side wall, the shroud also having two parallel and opposing substantially straight edges which extend between the curved edge, with the straight edges being separated by a distance greater than the combined width of the two heat exchange bundles, and thereby providing for vertical liquid flow two opposing chordal openings in the cross-section of the vessel defined by the straight edges of the shroud and the internal surface of the side wall;

(i) a first pair of chordal liquid baffle plates located within the vessel above the shroud, the first pair of plates being operably positioned on opposing sides of the side wall at points directly above the two chordal openings in the cross-section of the vessel defined by the shroud, with each baffle plate having a curved edge which abuts the internal surface of the side wall and a straight edge which is parallel to the straight edges of the shroud, the vertical distance between the first pair of baffle plates and the upper end of the vessel being greater than the radius of the vessel, with the internal volume of the vessel above the first pair of baffle plates being devoid of structural components which extend across the cross-section of the vessel; and, (j) a second pair of chordal liquid baffle plates located within the vessel, the second pair of plates being operably positioned on opposing sides of the side wall at points directly below the two chordal openings in the cross-section of the vessel defined by the shroud, each baffle plate having a curved edge which abuts the internal surface of the side wall and a straight edge which is parallel to the straight edges of the shroud, the straight edge of each baffle plate being located below a horizontal centerline through the first and second bundle heat exchange tubes, whereby a stream of solvent may be fed to the lower section of the vessel through the solvent inlet means to countercurrently contact a black oil stream charged through the charge stock inlet means in the first plurality of contacting trays and then to countercurrently contact a second liquid phase in the second plurality of contacting trays, with the resulting extract stream being caused to pass upward through the heat exchange means by the action of the second pair of baffle plates and admixed to a uniform temperature by the action of the shroud and the first pair of baffle plates, with the extract stream then being retained within a quiescent settling zone above the first pair of baffle plates before being discharged from the vessel.

2. The apparatus of claim 1 further characterized in that there is provided a third and a fourth bundle of horizontal U-shaped heat exchange tubes located directly below and aligned with the first and the second bundles at a point below the second pair of chordal liquid baffle plates, the third and the fourth bundles passing through the side wall on opposing sides of the vessel from the bundle located directly above.

3. The apparatus of claim 2 further characterized in that a second horizontal shroud is operably positioned bwlow the first and the second bundles of heat exchanger tubes and above the third and fourth bundles, the longitudinal axis of the second shroud being aligned parallel to the straight edges of the first shroud, the second shroud having two parallel straight edges which are parallel to the longitudinal axis of the first shroud and which are separated by a distance which is less than that between the straight edges of the first shroud.

* * * * *